United States Patent
Crandall et al.

(10) Patent No.: US 9,796,336 B2
(45) Date of Patent: Oct. 24, 2017

(54) EXTRUDED SUPPORT MEMBERS FOR FACILITATING ACCESS TO A VEHICLE AND RELATED METHODS

(71) Applicants: Robert Crandall, Yorba Linda, CA (US); William H. Cord, Corona Del Mar, CA (US)

(72) Inventors: Robert Crandall, Yorba Linda, CA (US); William H. Cord, Corona Del Mar, CA (US)

(73) Assignees: Robert Crandall, Yorba Linda, CA (US); William H. Cord, Corona Del Mar, CA (US)

( * ) Notice: Subject to any disclaimer, the term of this patent is extended or adjusted under 35 U.S.C. 154(b) by 0 days.

(21) Appl. No.: 15/191,168

(22) Filed: Jun. 23, 2016

(65) Prior Publication Data

US 2016/0362052 A1     Dec. 15, 2016

Related U.S. Application Data

(63) Continuation of application No. 14/835,956, filed on Aug. 26, 2015, now Pat. No. 9,399,431.

(60) Provisional application No. 62/042,152, filed on Aug. 26, 2014.

(51) Int. Cl.
*B60R 3/00* (2006.01)
*B60Q 1/32* (2006.01)
*B62D 65/16* (2006.01)
*B60Q 1/26* (2006.01)

(52) U.S. Cl.
CPC ............ *B60R 3/002* (2013.01); *B60Q 1/2696* (2013.01); *B60Q 1/323* (2013.01); *B62D 65/16* (2013.01)

(58) Field of Classification Search
CPC ........ B60Q 1/323; B60Q 1/2696; B60R 3/00; B60R 3/002; B60R 3/02; B60R 3/04; B62D 65/16
USPC .......... 280/163, 164.1, 164.2, 165, 166, 169
See application file for complete search history.

(56) References Cited

U.S. PATENT DOCUMENTS

| | | |
|---|---|---|
| 2,559,123 A | 7/1951 | Jackson |
| 3,862,670 A | 1/1975 | Hovey |
| 4,200,303 A | 4/1980 | Kelly |
| 4,333,547 A | 6/1982 | Johansson |

(Continued)

FOREIGN PATENT DOCUMENTS

EP        0210465       2/1987

OTHER PUBLICATIONS

Photograph showing an Off-Road Accessory 'N-Fab a Step Above . . .'; Specialty Equipment Market Association (SEMA) Show; Las Vegas, Nevada; Oct. 30, 2012.

(Continued)

*Primary Examiner* — John D Walters
(74) *Attorney, Agent, or Firm* — Klein, O'Neill & Singh, LLP

(57) ABSTRACT

Support devices and their components are disclosed, including an optional lighting element mountable on the support device for emitting light. The support device facilitates access to a vehicle and includes an elongate extruded support member, brackets for mounting the elongate extruded support member to a vehicle, and a step affixed to the elongate extruded support member. A mount can be provided and coupled to the lighting element and to the step to secure the lighting element to the step when the lighting element is incorporated.

31 Claims, 15 Drawing Sheets

(56) References Cited

U.S. PATENT DOCUMENTS

| | | | |
|---|---|---|---|
| D292,904 S | 11/1987 | Bielby | |
| 4,935,638 A | 6/1990 | Straka | |
| 5,046,582 A | 9/1991 | Albrecht | |
| D340,905 S | 11/1993 | Orth, Sr. et al. | |
| 5,732,996 A | 3/1998 | Graffy et al. | |
| 5,895,064 A | 4/1999 | Laubach | |
| 6,435,534 B1 | 8/2002 | Stone | |
| D474,435 S | 5/2003 | Lund et al. | |
| 6,588,783 B2 | 7/2003 | Fichter | |
| 6,709,137 B1 * | 3/2004 | Glovak | B60Q 1/323 362/495 |
| 6,874,801 B2 | 4/2005 | Fichter | |
| D535,928 S | 1/2007 | Crandall | |
| D546,745 S | 7/2007 | Storer | |
| 7,287,770 B2 | 10/2007 | Drabant et al. | |
| D567,729 S | 4/2008 | Crandall | |
| 7,360,779 B2 | 4/2008 | Crandall | |
| 7,416,202 B2 | 8/2008 | Fichter | |
| 7,717,444 B2 | 5/2010 | Fichter | |
| 7,909,344 B1 * | 3/2011 | Bundy | B60R 3/002 280/163 |
| 7,946,604 B2 | 5/2011 | Crandall | |
| 8,152,187 B1 | 4/2012 | Crandall | |
| D665,713 S | 8/2012 | Pochurek et al. | |
| D671,874 S | 12/2012 | Kekich, Jr. et al. | |
| 8,448,968 B1 | 5/2013 | Grote et al. | |
| 8,641,068 B1 * | 2/2014 | Bundy | B60R 3/002 280/163 |
| 8,702,284 B2 * | 4/2014 | Huang-Tsai | B60Q 1/323 362/249.02 |
| 8,827,293 B1 | 9/2014 | Bundy | |
| 9,096,176 B2 * | 8/2015 | Muhe-Sturm | A62C 27/00 |
| D757,622 S | 5/2016 | Wolf | |
| 2007/0290475 A1 * | 12/2007 | Reitinger | B60Q 1/323 280/164.1 |
| 2012/0104718 A1 * | 5/2012 | Alvarez | B60R 3/00 280/163 |
| 2012/0228848 A1 | 9/2012 | Fichter | |
| 2013/0221632 A1 | 8/2013 | Higgs et al. | |
| 2015/0175059 A1 * | 6/2015 | Dellock | F21S 48/214 362/510 |
| 2015/0183376 A1 | 7/2015 | Fichter | |

OTHER PUBLICATIONS

Non-Final Office Action on related US application (U.S. Appl. No. 14/835,956) dated Mar. 10, 2016.

Notice of Allowance on related US application (U.S. Appl. No. 14/947,171) dated Mar. 22, 2016.

\* cited by examiner

EXTRUDED SUPPORT MEMBERS FOR FACILITATING ACCESS TO A VEHICLE AND RELATED METHODS

CROSS-REFERENCE TO RELATED APPLICATION

This is a continuation application of Ser. No. 14/835,956, filed Aug. 26, 2015, which is a regular application of Provisional Application No. 62/042,152, filed Aug. 26, 2014, the contents of which are expressly incorporated herein by reference and for which the present application claims priority.

FIELD OF ART

The field of the invention relates to systems and methods for facilitating entry and exit from a vehicle.

BACKGROUND

Vehicles provide transportation for people and objects over distances. While many vehicles are low to the ground or have otherwise easily accessible passenger compartments, some do not and entry and exit may present a challenge. Typical examples of vehicles with more difficult access to passenger compartments include pickup trucks, sport-utility vehicles, off-road vehicles, "raised" or "lifted" automobiles and others. In these types of vehicles the passenger compartment or compartments may be located at a height which makes entry and exit challenging for children, the elderly or infirm and even normal abled-body adults.

Various solutions are available for addressing the problem of easy access to a passenger's compartment including the use of running boards, attached step-ladders, handles to assist a passenger in pulling themselves up and others. However, existing solutions still have many drawbacks. These drawbacks include twisting from applied weight, capturing dirt and other debris, inability to adjust the mounting position, and difficulty or impossibility of modification or removal.

SUMMARY

Support devices and lighting elements usable with support devices are disclosed. The lighting elements can emit light along a single direction, such as a unidirectional light, and can be coupled with additional lighting elements to emit light along two or more directions, such as up and down relative to a horizontal plane. The lighting elements may be installed on a running board of a vehicle, on an extruded support member, on one or more steps connected to the extruded support member, or combinations thereof.

Various power arrangements and control options are available for powering the controlling the lighting elements, which can comprise LED strips comprising a plurality of individual LEDs per unit length. The strips can be mounted to a flexible fiber board or to a rigid housing or board, such as an aluminum housing.

Aspects of the present disclosure includes a support device for facilitating access to vehicles. The support device can comprise: an elongate extruded support member comprising a length; brackets for mounting the elongate extruded support member to a vehicle; a step affixed to the elongate extruded support member, wherein the step comprising a landing surface comprising holes allowing light to pass therethrough; a lighting element mounted below the landing surface and configured to emit light through the holes in the landing surface; and a mount coupled to the lighting element and to the step to secure the lighting element to the step.

The support device wherein the lighting element can be powered by a battery located in an underside cavity of the step.

The support device wherein the brackets can be repositionable along the length of the elongate extruded support member.

The support device wherein the step can be a first step and the support device can further comprise a second step affixed to the elongate extruded support member and spaced from the first step.

The support device wherein the mount can comprise a ring defining a fitted hole for securing the lighting element.

The support device can further comprise a first support extending from the ring and a second support extending from the ring and spaced from the first support.

The support device wherein the lighting element can emit light out through the holes and through an underside opening opposite the landing surface.

The support device wherein the lighting element can be connected to a controller of a vehicle and operable by a switch located inside the vehicle.

Aspects of the present disclosure further include a support device for facilitating access to vehicles comprising: an elongate extruded support member comprising a length; brackets for mounting the elongate extruded support member to a vehicle; a step affixed to the elongate extruded support member, wherein the step comprising a landing surface comprising holes allowing light to pass therethrough; a lighting element mounted below the landing surface and configured to emit light through the holes in the landing surface and to a ground surface away from the landing surface; and wherein the lighting element comprises a unidirectional LED strip comprising a plurality of LEDs.

The support device wherein the step can comprise a sub-assembly comprising a tubular lower step bar and two attachment brackets and wherein an angle is provided between each of the two attachment brackets and the tubular lower step bar.

The support device wherein the step can comprise a step bar attached to the tubular lower step bar; and wherein the step bar can comprise the landing surface comprising holes.

The support device wherein the lighting element can be located in a transparent housing and filled with a transparent epoxy resin.

The support device wherein the lighting element can comprise a first row of light and wherein a second row of light can be located in adjacent contact with the first row of light.

The support device wherein the two row of lights can be located in a transparent housing and mounted under the landing surface.

The support device wherein the extruded support member can be non-circular and wherein the two attachment brackets can be welded to the extruded support member.

A further aspect of the present disclosure includes a method for manufacturing a support device for use to access a vehicle. The method can comprise: obtaining an extruded support member comprising a length; attaching brackets to the extruded support member so that the extruded support member can attach to a vehicle through the brackets; securing a step to the elongate extruded support member, wherein the step comprises a landing surface comprising holes to allow light to pass therethrough; mounting a lighting element below the landing surface so that when the lighting element is activated, light is illuminated through the holes in the landing surface and to a ground surface away from the landing surface; and wherein the lighting element comprises a unidirectional LED strip comprising a plurality of LEDs.

The method wherein the step can comprise a step subassembly comprising a tubular section with two bends forming a lower step bar and two attachment flanges.

The method wherein the extruded support member can be non-circular in cross-section and wherein the two attachment flanges can be welded to the extruded support member.

A still further aspect of the present disclosure is a support device for facilitating access to vehicles comprising: an elongate hollow support member comprising a length and having a landing surface; brackets attached to the hollow support member and to a vehicle; a lighting element mounted below the landing surface and configured to emit light in a direction opposite the landing surface or through holes provided in the landing surface; and a mount or bracket coupling the lighting element to the elongate hollow support member.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of support members provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
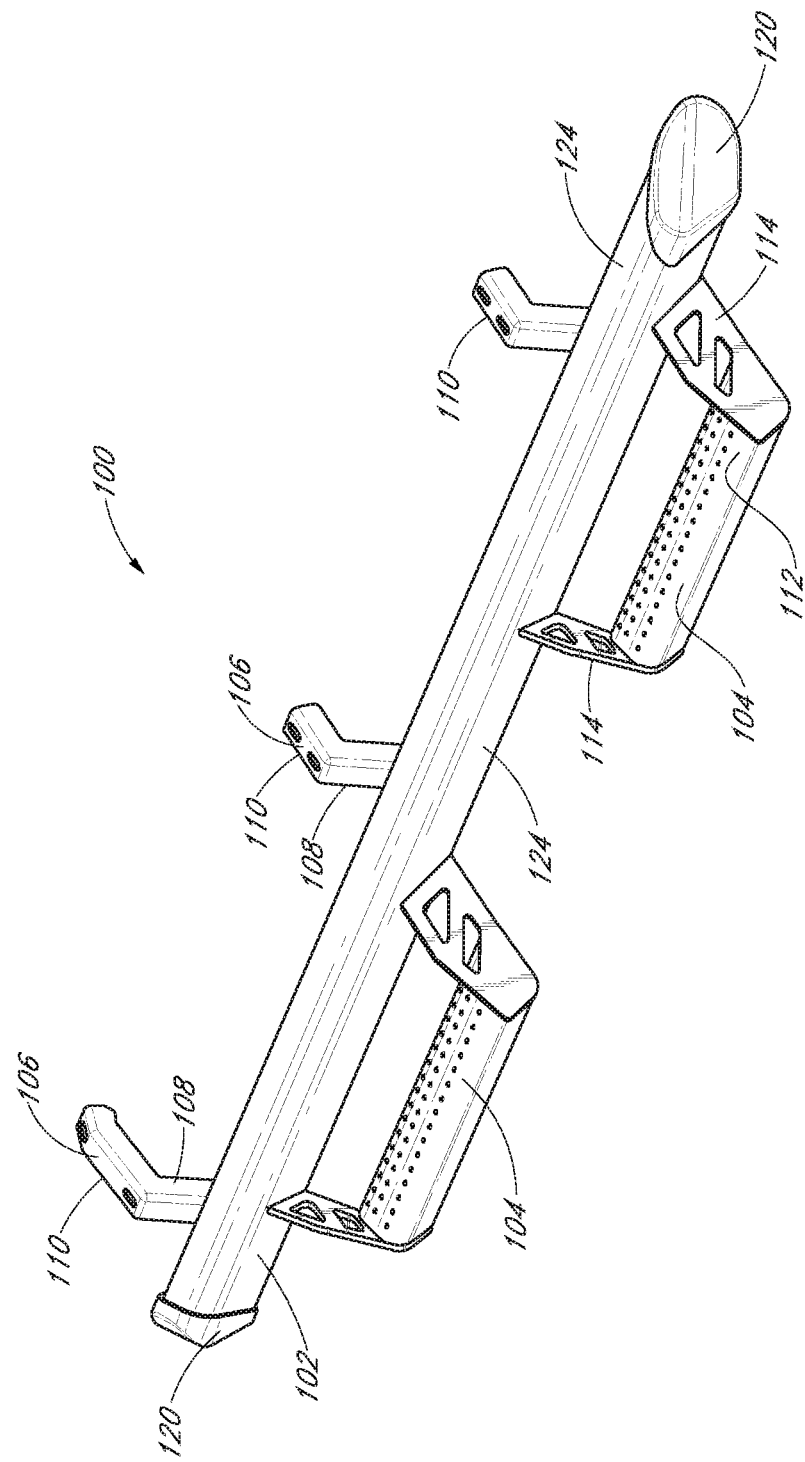
FIG. 1 shows a support device comprising an extruded support member with steps according to an embodiment of the present invention.

FIG. 1 is an exemplary perspective view of a support device 100 provided in accordance with aspects of the present disclosure. In the example embodiment, the support device 100 is provided with an extruded support member 102 comprising one or more steps 104 and one or more brackets 106 for attaching the support device 100 to a vehicle 10 (FIG. 2), such as to a pickup truck, a van or a sport utility vehicle (SUV), to name a few non-limiting examples. The number of steps 104 incorporated with the support device 100 can depend on the number of doors the support device is mounted to, such as a two door truck or a four door SUV.

The brackets 106, which can total three, more than three or less than three, are shaped metals attached to the elongated extruded support member 102, such as being welded thereto or secured thereto using fastening means. The brackets 106 can each have a base 108 and a flange or mounting flange 110, which can have one or more mounting holes to receive fasteners for fastening the support device 100 to a vehicle. The flanges 110 of the brackets 106 can be similar or different in size, shape, and/or contour so as to comport to the shape of the vehicle to be mounted therewith. In some examples, each bracket 106 can have two flanges 110 and resembles a Z-shaped structure, as further discussed below with reference to FIG. 4.

The steps 104 can each comprise a step bar 112 and two attachment flanges 114. As shown, the attachment flanges 114 can be welded to the step bar 112 and to the extruded support member 102. In other examples, the attachment flanges 114 are fastened to the step bar 112 and the support member 102. The step bar 112 can have the same shape or structure as the support member 102 or different, such as having a smaller cross-section or a different shaped cross-section. As further discussed below, the step bar 112 can be hollow with an upper bottom cavity for optionally mounting accessory devices, such as one or more lighting elements. The two flanges 114 can embody flat plates with optional openings for aesthetic appeal and to decrease drag. The two flanges 114 can be angled or be flat or straight as necessary to secure to both the step bar 112 and the support member 102.

A cap or end cap 120 can be mounted to each end of the support member 102. The cap 120 can prevent dust and other build ups from entering the interior of the support member 102. As shown, the cap 120 each frictionally engages the exterior and/or interior of the support member 102 to secure therewith. In some examples, detents, fasteners, such as set screws, or other securement means may be used to more securely attach the caps to each end of the support member. The cap can be made from plastic or cast metal.

In an exemplary embodiment, the extruded support member 102 has a pseudo oval shape or a pseudo inverse trapezoid profile (also shown in FIG. 4) with a hollow interior. In other examples, the support member 102 may have other cross-sectional shapes, including an elongated oval shape, an irregular shape, etc. so long as an upper surface of the structure for use to step on has a stepped surface with a sufficient surface area to support a user's foot or feet. The shape of the support member 102 may simply be referred to as a support profile for simplicity. The support profile of the extruded support member 102 includes a top landing surface 122 and a side support surface 124. In an example, the side support surface 124 embodies a flat angled surface giving the steps 104 a relatively larger mounting surface (larger vertical cross section—the amount of material measured vertically) to mount the attachment flanges 114. As a result, this stable support provided by the flat angled surface increases safety because there is less chance that a passenger attempting to enter a vehicle may be thrown or slip off the device due to the device twisting than in other configurations, thereby reducing the likelihood of injury from falling.

Similarly, reliability of use of the support device 100 is increased when there is less chance of twisting such that a passenger will be able to enter the vehicle successfully without falling. Thus, an aspect of the present disclosure is understood to include a support device 100 having a support member 102 with a top landing surface 122 of sufficient landing surface area to comfortably and safely support a user when traversing the vehicle in combination with a side support surface 124 having a sufficiently large vertical cross section to increase the mounting area or surface for one or more steps 104. Additionally, overall performance of the device 100 for its intended purpose is increased. In some embodiments, the extruded support member 102 may have a curved or arced upper surface 124. In some embodiments the upper surface or top landing surface 124 of the extruded support member 102 may be intended as a step. In yet other examples, surface features may be provided on the top landing surface 124 to increase grip-ability as a surface for stepping.

In an exemplary embodiment, the extruded support member 102 is crafted of extruded aluminum with other materials contemplated. Extrusion is a process by which objects may be created that have a consistent cross sectional profile throughout. Typically extrusion is achieved by drawing or pushing a material through a die having the desired cross-section. Use of extrusion, especially extruded aluminum, allows for the creation of more complex cross-sectional profiles than many other manufacturing techniques. For example, steel running boards may have a limited number of designs such as round, square and rectangular while a device created using extrusion has many additional and more complex alternatives. In still other examples, extensions may be added, such as fastened, welded, or combinations thereof, to the extruded body to form even more example shapes. For example, additional step plates may be added to the regions or areas of the support member 102 to be stepped on to increase surface area and possibly texture to enhance gripping and friction. For example, this allows for a simple generic under support member to be used and for a final upper support area to be attached thereto for functionality and appeal. The extruded support member 102 may be hollow or semi-hollow in various embodiments. For example, ribs may be added or provided in the interior to increase the structural integrity of the support member. In some embodiments, the extruded support member 102 may be made of extruded aluminum or reinforced composite material. Engineered plastic, such as PEEK, is also contemplated and is known to be rigid and strong. The extruded support member 102 is described further with regard to FIGS. 10-11 below.

Also shown in FIG. 1 are end-caps 120, which seal the ends of the extruded member 102. Sealing may help to prevent dirt, dust, mud, water, oil and other debris and substances from entering and becoming trapped in the interior of extruded member 102 in embodiments where the extruded member is hollow or semi-hollow. Depending on the debris or substance, hidden corrosion of the interior of the extruded member can be prevented by using the end-caps 120. In some embodiments, the end caps 120 may be secured to the extruded support member using one or more securing means. Securing means may include welds, crimps, solders, tapes, glues, epoxies, cements, other adhesives, clips, clasps, screws or other securing means.

In some examples, the support device 100 may be practiced with just the extruded support member 102, without the steps 104. Thus, as discussed further below with reference to FIG. 2, when mounted to a vehicle, a user or a passenger can step directly onto the extruded support member 102 to gain access to the vehicle since one or both steps can be omitted in the alternative embodiment. The support device 100, without the steps 104, resembles a running board on a typical SUV or truck.

Figure 2:
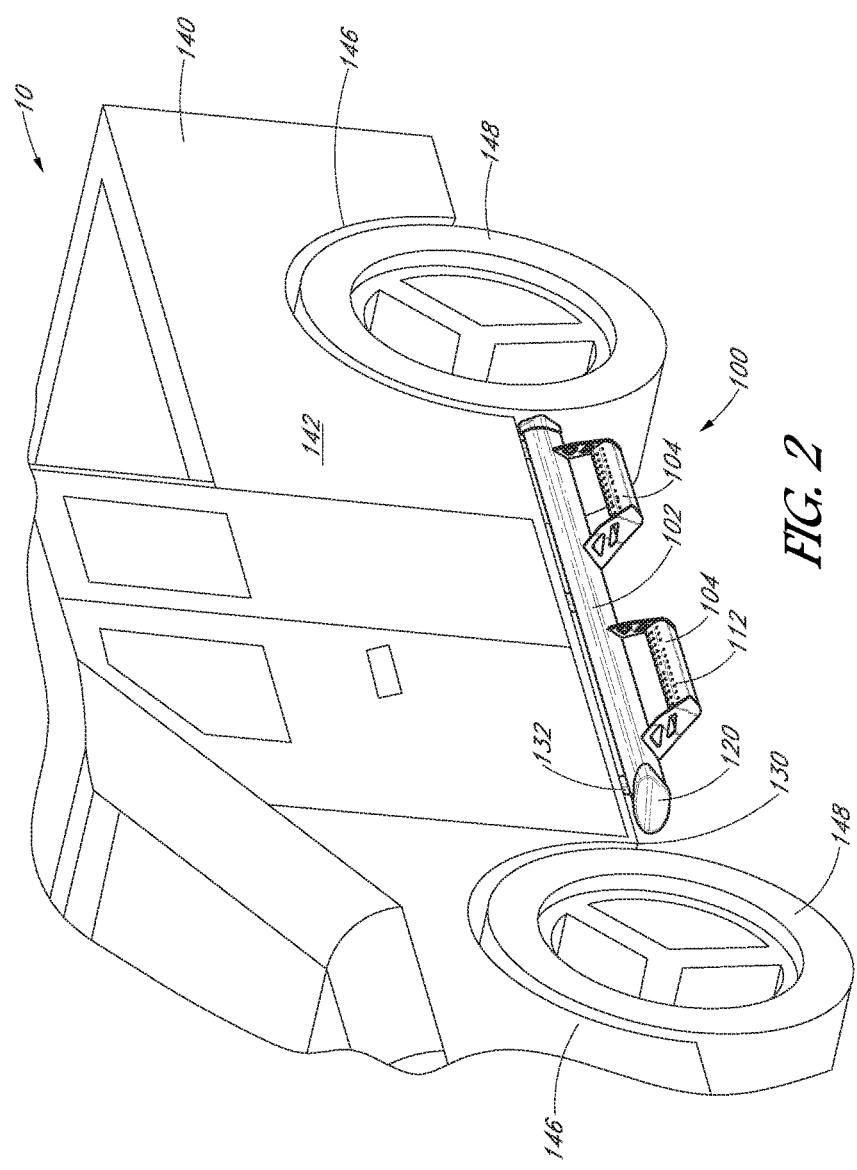
FIG. 2 is an example view of an extruded support member with steps attached to a pickup truck according to an embodiment of the present invention.
Figure 4:
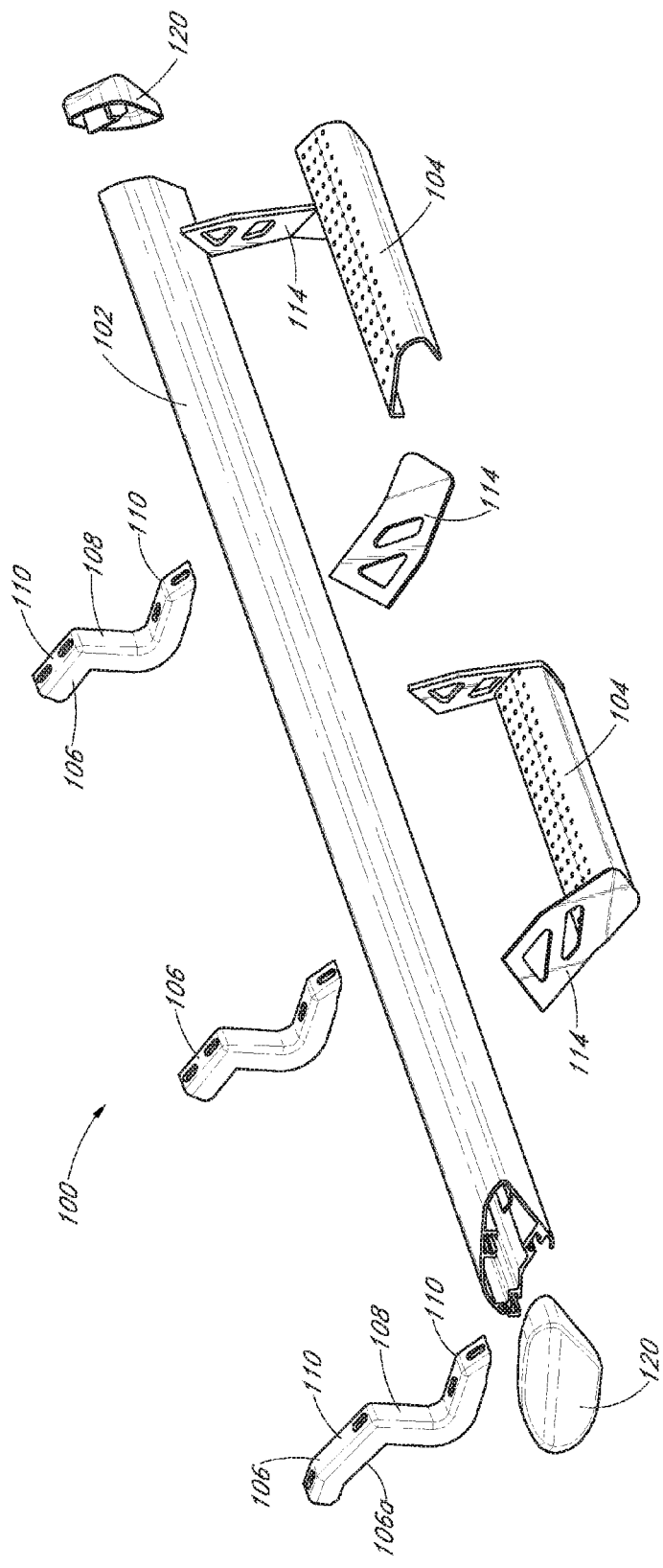
FIG. 4 is an example exploded view of a support device comprising an extruded support member with steps according to an embodiment of the present invention.

With reference to FIG. 4, several brackets 106, among others things, are shown. The brackets 106 serve as means for securing the extruded support member 102 to a vehicle 10 (FIG. 2). In an exemplary embodiment, two different types of brackets 106, 106*a* are shown. For example, one of the brackets 106*a* may have two different mounting flanges 110 extending from a base 108 while other brackets 106 may each have two similar mounting flanges 110. Different brackets 106 and different flanges 110 may be incorporated depending on the needs, such as depending on different vehicle types requiring different mounting arrangements and configurations, to attach the support device 100 to the vehicle. For example, one bracket 106 may have a longer base 108 than other brackets or different flanges 110 with different mounting holes due to the particular configuration of the vehicle. In other embodiments, all brackets 106 may be identical, all brackets may be different, or a mixture of brackets may be used. The type of brackets 106 used may be application specific such that one make and model of vehicle may require a particular type, length, or size of bracket in order to provide adequate clearance from the vehicle for the device. Bracket arm length or base 108 as well as the lengths of the flange 110 may also be different in various embodiments in order to facilitate assembly and passenger compartment access. In an exemplary embodiment, the flanges 110 of the brackets 106 are shown with two holes each, operable to receive screws, nails or other fasteners. In other embodiments, the flanges 110 of the brackets may be fitted with threaded holes, clips, clamps, clasps, bolts and/or other securing means. The flanges 110 may be placed on the support member 102 in compatible locations with receivers, guides or other equipped parts located on a vehicle body in installation locations and configurations operable to support the support device 100 and loads placed on the device 100. Locations for installation on a vehicle may include body panels, chassis, frame, bumpers and other locations. In some examples, the locations of the brackets 106 on the support member 102 may be adjustable, such as slidable or positionable along the length of the support member 102, to enable fine tuning of the various mounts or mount locations between the support device 100 and the vehicle to facilitate installation.

The brackets 106 can attach to a vehicle's underside 130 (FIG. 2) to provide mounting support for the extruded support member 102. In some embodiments, brackets 106 may be attached to a side 132 of a vehicle 10, such as to the side of the lower frame below the doors, to provide mounting support for the extruded support member 102. In some embodiments, brackets 106 may be attached to both a vehicle underside 130 and side 132 to provide mounting support for the extruded support member 102. In an exemplary embodiment, brackets 106 (FIG. 1) are shown as nearly evenly spaced along the length of the extruded support member 102. In some embodiments, brackets 106 may not be located so evenly spaced and may be closer to one end of the extruded support member. In the example embodiment shown, brackets 106 are mounted to the underside of the extruded member 102. In various other embodiments, brackets 106 may be mounted to the side, top or other interior or exterior surface of the extruded member 102. In some examples, the support member 102 can include a groove along a length thereof and the 106 brackets can each incorporate a tongue for engaging the groove in a tongue-and-groove arrangement. This allows the brackets to be adjusted along the length of the support member 102. Fasteners and fastening plates or washers may be used to secure the brackets to the support member.

While the support device 100 of FIG. 1 shows three brackets 106, it should be understood that fewer or additional brackets may be used in various embodiments. Additionally, brackets 106 may be oriented or arranged differently. While the example embodiment shows brackets 106 with a straight bar configuration extending perpendicular to the longitudinal axis of the extruded support member 102, in other embodiments some or all brackets may have different structural shapes such as "I", "Y", "V", "X", "T" frame or others. Some or all brackets 106 may also extend at angles other than perpendicular to the longitudinal axis of the extruded support member 102. Other reinforcing members may also be provided between brackets, across brackets, through brackets, etc. in order to provide additional structural integrity.

With reference again to FIG. 2 in addition to FIG. 1, an extruded support member 100 with attached steps 104 is shown in an operational configuration attached to a pickup truck 10, which can alternatively be a different type of vehicle, such as an SUV or a van. In the example embodiment, the extruded support member 102 is mounted on the pickup truck using brackets (hidden from view) on the vehicle underside 130. In the example embodiment, the extruded support member 102 is mounted such that it runs parallel to the side 132 of the vehicle body 140 and is located partially beyond the side wall or side panel 142 of the vehicle 10. In this configuration, the steps 104 are located beyond the side wall 142 of the vehicle 10. For example, the edge of the step bar 112 of each step closest to the vehicle 10 can extend laterally of the side wall 142 such that the steps 104 are completely beyond the side wall of the vehicle. In some embodiments, the extruded support member 102 may be located completely underneath 130 the vehicle body 140 or completely beyond the side wall 142 of the vehicle 10. Additionally, in some embodiments the extruded support member 102 may include mechanisms which allow for adjustment based on user needs. For instance, in some contemplated embodiments, the extruded member 102 may be swung out from a stored configuration under the body of the vehicle to an operable configuration outside the vehicle footprint and locked into place for use by various mechanisms. Such mechanisms may be manually manipulated, automatically manipulated, or semi-automatically manipulated. A support device 100 may be mounted on each side of the vehicle 10. Additional support devices 100 may be mounted to the front and/or the rear of the vehicle, such as to allow access to the vehicle's engine or the vehicle's truck bed.

While the example embodiment shows the extruded support member 102 extending from near one wheel well 146 to another wheel well 146, it should be understood that extruded support members 102 in various embodiments of the present disclosure may be much shorter or may be longer and mounted such that they extend to an area outside the wheels 148.

Although the two steps 104 appear identical in the embodiment shown, they are not identical in every embodiments of the invention and additional or fewer steps may be provided as necessary. Also, in some embodiments, a step 104 mounted directly to the extruded member 102 may have one or more steps 104 mounted below it, such that it has a ladder or step ladder configuration.

Figure 3:
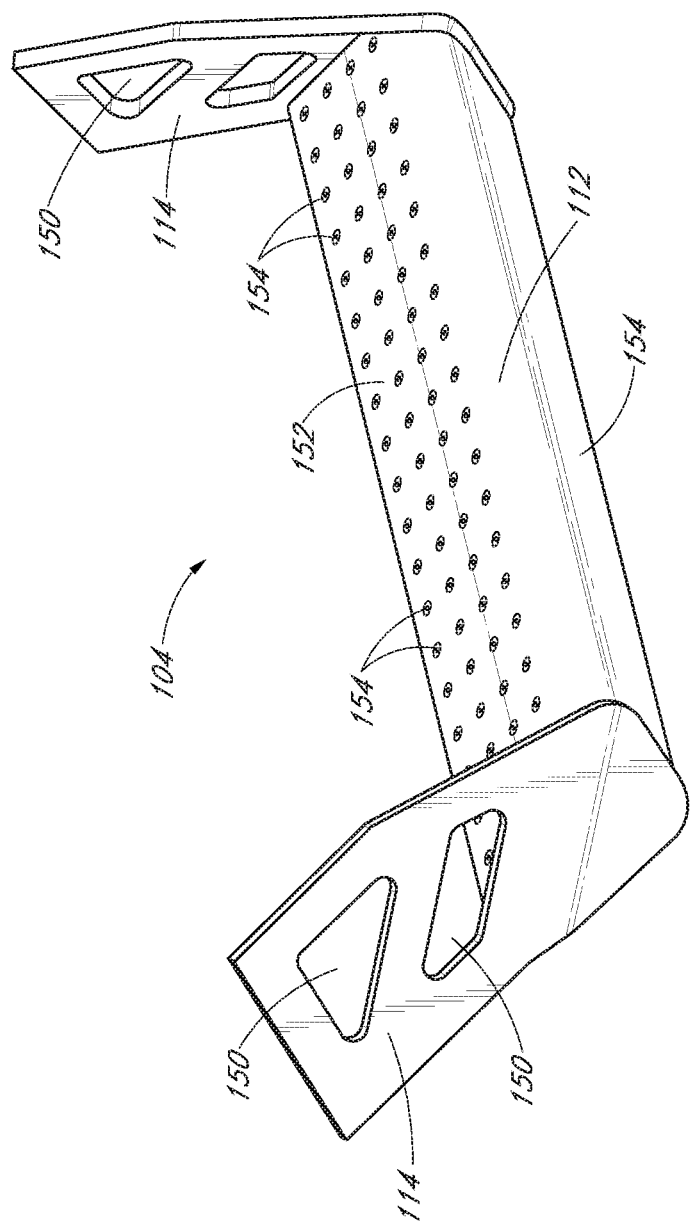
FIG. 3 is an example view of a step according to an embodiment of the present invention.

Turning now to FIG. 3, a blown up view of an exemplary embodiment of a step 104 is shown in accordance with the present invention. In the example embodiment, a step bar 112 is shown along with two suspension arms or attachment flanges 114. As shown in FIGS. 1-2 and 4, the suspension arms or attachment flanges 114 attach to the extruded support member 102 and provide support to the step bar 112. In other embodiments, a single or three or more suspension arms or attachment flanges 114 may be used to provide support for the step bar 112. In the example embodiment, the attachment flanges 114 are shown with cutout holes 150. This serves to reduce wind resistance when the vehicle is in motion, to reduce debris collection and to reduce the weight of the step. In some examples, the shape of the cutout holes 150 on each attachment flange 114 can be the same or different. In a particular example, a customer may custom order the shape of the cutout holes in accordance with his or her liking. For example, the cutout holes can have letter shapes, number shapes, geometrical shapes, and combinations thereof so that the customer can request to have his or her name formed as cut-outs or etched. Additionally, the suspension arms or attachment flanges 114 are generally flat in order to facilitate more efficient manufacturing and provide an important surface for embellishment using cutouts, badges, paint, or other method. In some embodiments, suspension arms 114 may be planar while in other embodiments suspension arms may have bends, curves, or other features. In the exemplary embodiment shown, the suspension arms 114 and step bars 112 are welded together although in other embodiments other connection means may be used, such as snaps, clasps, or others. Suspension arms 114 in some embodiments can be solid structures with no holes. While the exemplary embodiment in FIG. 2 shows suspension arms 114 mounted at roughly a forty-five degree angle between a ground surface and its perpendicular, it should be understood that the suspension arms 114 can be mounted at different angles in various embodiments. The suspension arms 114 can have a uniform thickness or variable thickness in various embodiments.

With further reference to FIG. 3, the step bar 112 can have a generally planar landing surface 152 for an upper surface and a back angled front edge 154 for added structural strength to the step design and to simplify manufacturing. The angled front edge 154 can be a solid structure or can have holes in different embodiments. In the exemplary embodiment, the landing surface 152 of the step bar 112 has holes 154, which allow dirt, sand, mud, water and other materials and substances to pass through without collecting on the steps. In some embodiments, the holes 154 are spread in a uniform pattern or array while in other embodiments the holes 154 may be created in a semi-regular or irregular pattern. In the example embodiment shown, the holes 154 are circular in shape. In some embodiments, the holes 154 may be square, rectangular, half-moon shaped, crescent shaped, oval shaped, triangular, or other shapes. The holes 154 in different locations of the base may be different shapes as well, such as triangular along the edges with square shaped along the interior. The holes 154 and the pattern in which they are arranged can provide traction advantages over a solid, uniform surface. In some embodiments, part or all of the circumference or perimeter of some or all of the holes 154 may be raised as bumps to increase surface friction for stepping. Alternatively or additionally, other bumps, grooves or irregular surfaces may be provided in order to provide traction for passengers stepping up into a passenger compartment. Friction pads may alternatively or additionally be applied to the landing surface 152 for increased traction.

In an exemplary embodiment, steps are permanently attached to the extruded support member 102, such as by welding. In other embodiments, the steps 104 can be removable. In some embodiments (such as that shown in FIG. 8), mountable screws and nuts can provide attachment between the steps and the extruded support member 102. In some embodiments, latches, locks, levers and other mechanisms can be used to secure the steps 104 to the extruded support member 102.

Figure 5:
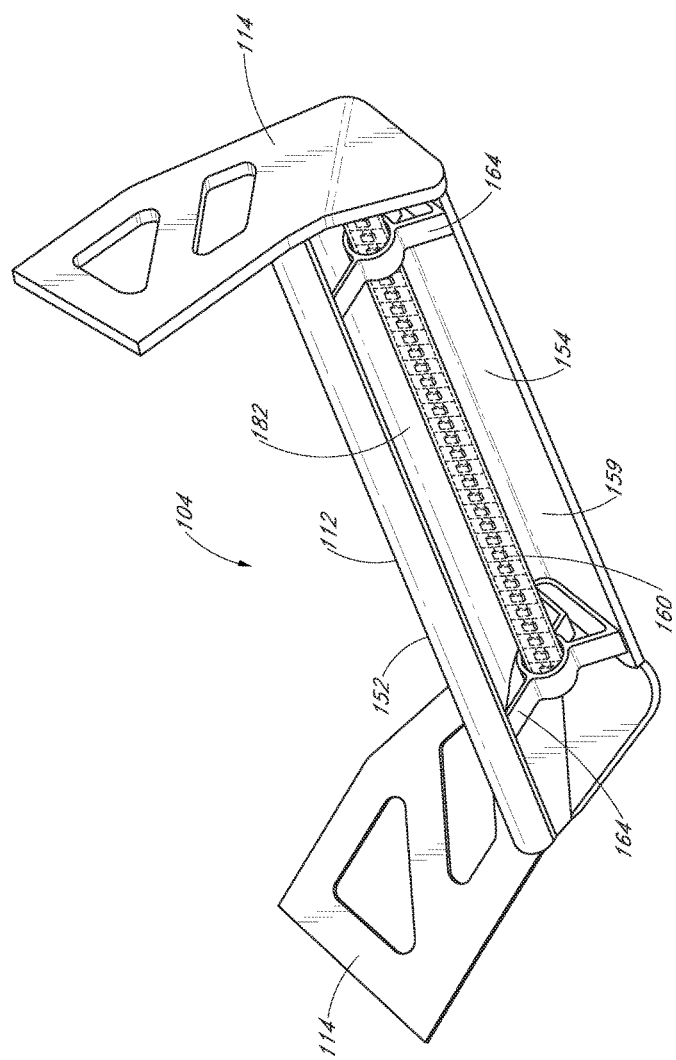
FIG. 5 is an example embodiment of a step with a lighting element and mounting for the lighting element.

Turning now to FIG. 5, an exemplary embodiment of a step 104 is shown from a back and underside perspective. In the example embodiment, a lighting element 160 is shown. In particular, the lighting element 160 is shown attached to the step bar 112 of the step 104. The lighting element 160 can be tubular, a bar, a strip or other configurations as appropriate. The lighting element 160 can include one or more lights to illuminate ground surfaces below the step. The lighting element 160 can include two or more light sub-assemblies 162 configured to illuminate ground surfaces below the step as well as through openings, holes, or etched surfaces to shine through the step to emit up, such as opposite the ground surfaces. Lights included in the lighting element 160 can be light emitting diodes (LEDs), florescent, or other light sources. For example, the lighting element 160 can embody a unidirectional light strip comprising a plurality of LEDs mounted on a flexible or a rigid fiber board. In other embodiments, the LEDs can be mounted on one or more aluminum boards. In embodiments with multiple lights, light color can be uniform or can include numerous colors. A single LED can also change colors without using multiple separate light sources to generate different colors, such as an RGB capable LED. The lighting element 160 can be configured to create patterns on illuminated surfaces, such as vehicle manufacturer names or insignias, other signs, or various other shapes or patterns.

In embodiments where the step bar 112 has holes 154 (FIG. 3) in its surface, the lighting element 160 can provide illumination to at least portions of the interior surfaces of the holes and through the holes to illuminate upwardly opposite the ground, and optionally also downwardly onto the ground or onto ground surfaces. The lighting element 160 can be supported by lighting support structures 164, such as mounting brackets. In some embodiments, different lighting support structures 164 can be used in complementary or replacement fashion to support and maintain the lighting element 160 in position.

Figure 7:
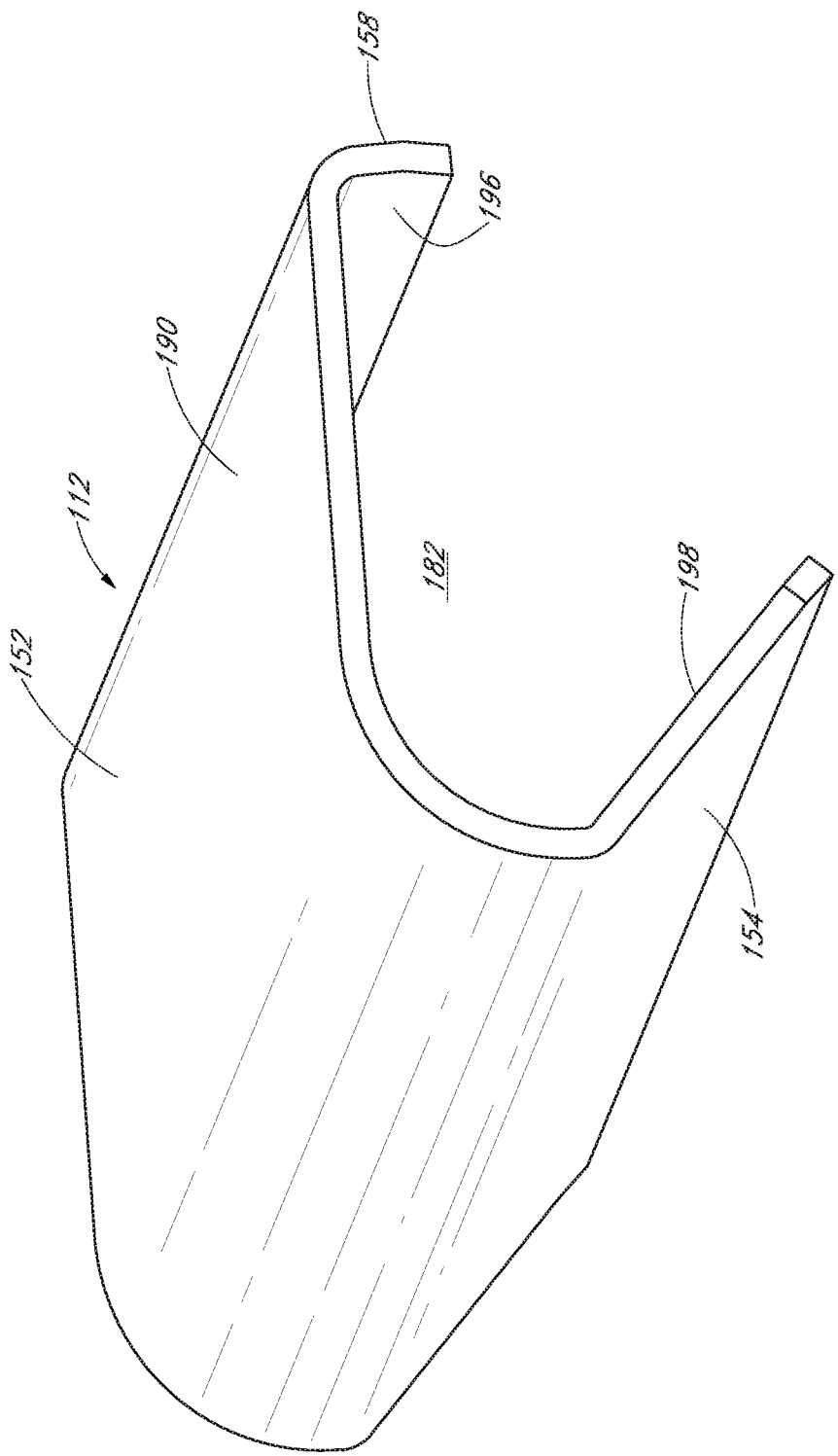
FIG. 7 is an example embodiment of a step plate or step bar.

The lighting element 160 can be powered by different power sources in different embodiments. In some embodiments, the lighting element 160 can be powered by independent batteries located adjacent or near the lighting element, such as a battery box or compartment located in the underside cavity 182 of the step bar 112 (FIG. 7). In other examples, the lighting element 160 may be wired such that it receives power from the vehicle electrical system. When independent batteries are used, photovoltaic recharging systems including all necessary components may be incorporated to charge the batteries.

The lighting element 160 can be operated by various different mechanisms or controllers. With reference to FIG. 7C, in some embodiments, the lighting element 160 can be wired to the light control system 280 of the vehicle to be controlled and powered thereby. Thus, the lighting element 160 can be turned on when a vehicle door is unlocked and/or opened. Similarly, the lighting element can be turned off when an open vehicle door is closed. The lighting element 160 can be turned on and/or off by one or more switches or buttons wired into the electrical system of the vehicle and mounted in the passenger compartment. Alternatively or addition thereto, switches or buttons to operate the lighting element 160 can be mounted on the exterior of the passenger compartment and/or elsewhere on the vehicle, such as to the interior of the vehicle or the passenger compartment so that the lighting element 160 can be manually or wirelessly activated to illuminate or not illuminate. In some embodiments, the lighting element switches or buttons for activating the lighting element 160 can be located on the step 104 so that they can be operated manually by engaging and/or disengaging them with a foot, hand, finger, or other appendage. In other embodiments, a wireless sensor can be mounted on the step and can detect a motion, such as from a foot, which can then turn on the lighting element 160. The lighting element 160 can be turned off by a timer, when the vehicle door is opened and then closed, when the vehicle cabin light is turned off, when the vehicle is set to drive, when manually turned off, or combinations thereof. With reference again to FIG. 7C, in some embodiments, the lighting element 160 can be coupled to a separate controller 282, apart from the vehicle's controller 280, so that it can be operated remotely by pressing a button on a remote controller, which sends an operation signal to a communications receiver on the separate controller 282 which relays the signal to an operative microcontroller and/or microprocessor with internal processing and a connected memory storing program code or logic for operating at least the lighting element 160. The microcontroller and/or microprocessor on the separate controller 282 is operable to change the state of the lighting element 160 using the program code or logic such that the lighting element can turn on, turn off, flash, dim, brighten, and/or any number of numerous other illumination patterns. In some embodiments, controllers 280 or 282 for lighting elements 160 described herein can be programmed to turn the lighting elements on only when the vehicle is in "park" and/or completely stopped, while in other embodiments lighting elements can be on any time the vehicle is on. In certain conditions, such as when used in off road conditions, the lighting elements 160 can be turned on when the vehicle is not on, such as remotely to allow passengers and drivers to see the vehicle and surrounding areas as they approach the vehicle under dark conditions. Optionally, dimmers may be included and controllable by the controllers to vary the light intensity or light output.

Figure 7A:
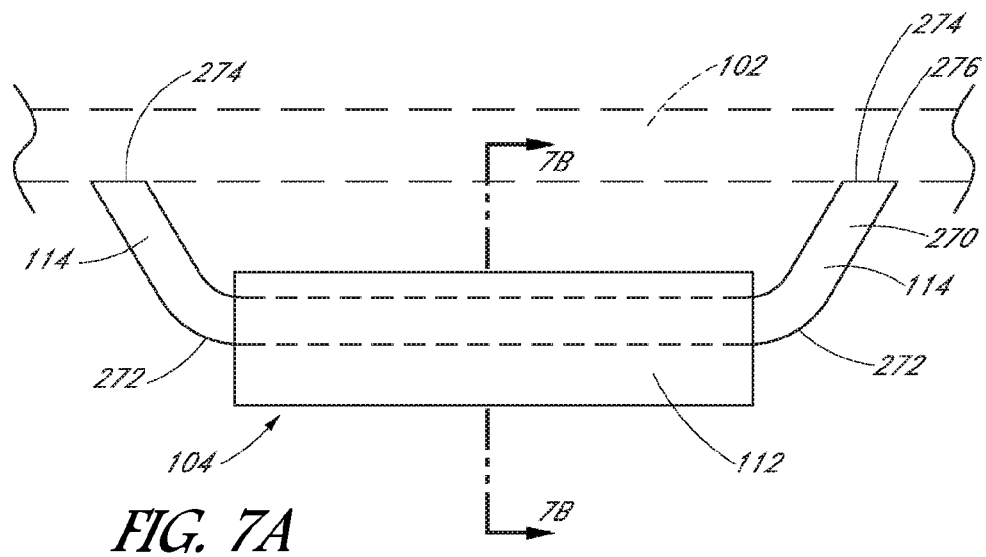
FIGS. 7A and 7B are schematic front elevation and cross-sectional side view of an alternative step provided in accordance with aspects of the present disclosure.
Figure 7B:
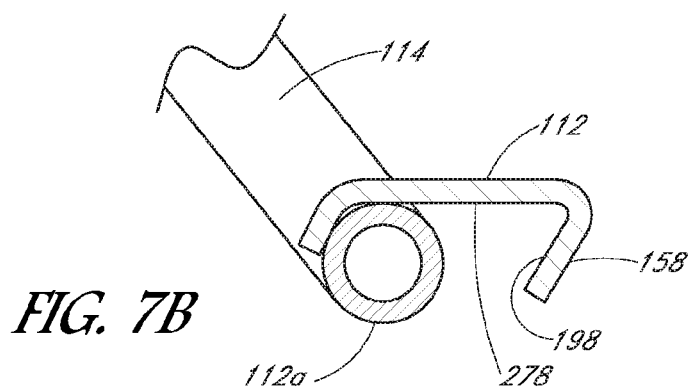
Figure 7C:
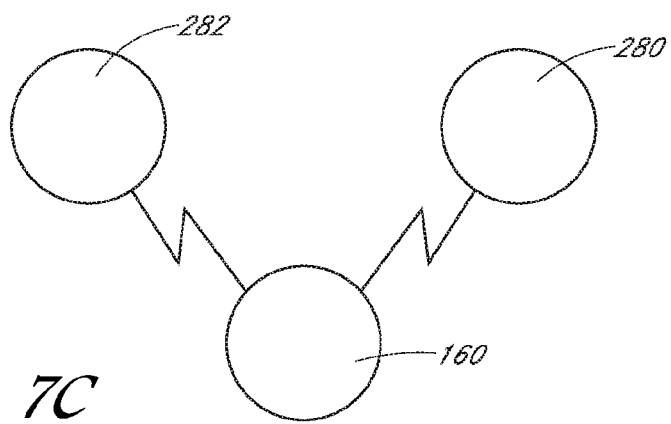
FIG. 7C is a schematic process diagram showing a lighting element connected to one or more controllers.
Figure 7D:
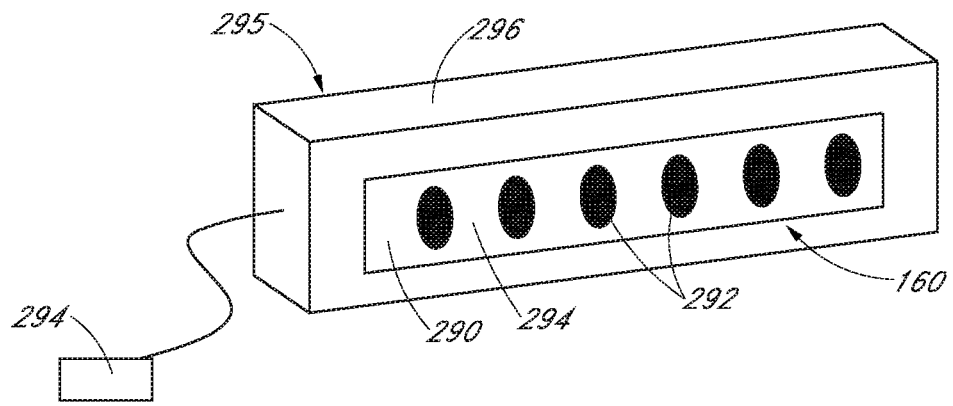
FIGS. 7D and 7E show two different versions of a light assembly.

With reference now to FIG. 7D, a lighting element 160 in the form of a unidirectional light strip 290 comprising a plurality of LEDs 292 mounted on a flexible board 294 is shown, which is also known as a directional LED strip or a surface mounted device (SMD) LEDs. The lighting element 160 is mounted to a rigid housing 296, such an aluminum housing having a recessed section for accommodating the LED strip, and terminated with a connector 294 for connecting to a companion connector, which is connected to a controller and a power supply. The light assembly 295 with rigid housing 296 and connector 296 may be used with or without further encasement, as further discussed below. In one example, the light strip of the lighting element 160 comprises 60 individual LEDs per 1 meter length for bright or high lumen applications. In other examples, the light strip comprises 30 LEDs per 1 meter length for a lower or ambient lighting application. When used with the steps 104 of the present disclosure, the lighting should range from about 175 lumens to about 500 lumens. In other applications, the light rating can be higher than 500 lumens. The LEDs 292 have color adjustable temperatures to control the intensity of the emitted light.

In an example, the LEDs 292 are not encased, which are also known as LED ribbons. However, the LEDs are preferably encased. For example, in the embodiment of FIG. 7F, the flexible light strip 290 of and rigid backing 296 of FIG. 7D are placed inside a transparent housing tube 300, which can be a clear or transparent hard thermoplastic material such as polycarbonate. The empty space 302 inside the housing tube 300 is then back-filled with a clear or transparent casting epoxy resin thus forming a lighting element assembly 161 comprising a dome shaped structure 304 around the plurality of LEDs.290. Light can emit through the transparent casting epoxy when cured. The dome shaped structure 304 can diffuse light emitted by the LEDs 292 to present a dispersed pattern of light when the LEDs are activated.

One or more brackets 310 may be fastened or bonded to the tube housing 300 to secure the lighting element assembly 161 to a step 104 of the present disclosure. For example, the lighting element assembly 161 may be secured to the underside cavity 182 of the step bar 112 of FIG. 7 by using one or both brackets 310 of the lighting element assembly 161 to attach to the interior contact surface 196 of the back angle rear edge 158 or the interior contact surface 198 of the back angle front edge 154. Alternatively, one or both brackets 310 may be used to secure the lighting element assembly 161 to the underside surface 278 of the step bar 112. The attachment can be by way of adhesive, Velcro, fasteners or screws, rivets, clips, or combinations thereof.

Figure 7E:
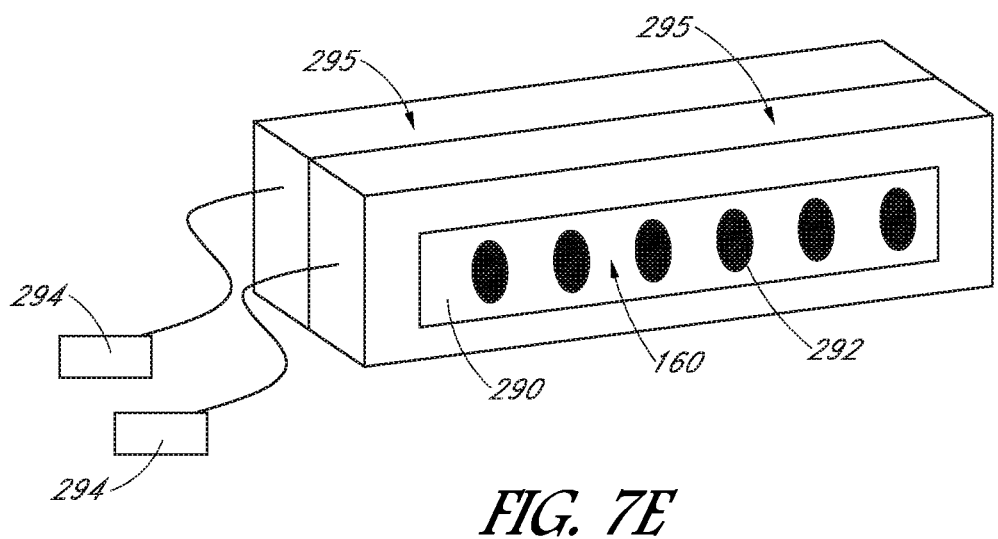

FIG. 7E shows the light assembly 295 mounted back to back to form a light assembly comprising at least two emitting rows of LEDs, mounted on a single rigid housing or on two different rigid housings. Like the embodiment of FIG. 7F, the two back-to-back light assembly may be placed inside a tube housing 300 and filled with a clear casting epoxy resin to form a lighting element assembly 161 comprising at least two rows of light strips or lighting elements 160. As the light strips can be unidirectional, the two light strips can be configured to shine light in opposite directions, such as one in an upward direction and one in a downward reaction. Accordingly, when the lighting element assembly 161 of FIG. 7I is used with a step 104 of the present disclosure, one row of lighting element can illuminate the ground surfaces while the other row of lighting element can illuminate upwards and through the holes or openings formed on the step bar 112 of the step 104.

Figures 7F, 7G:
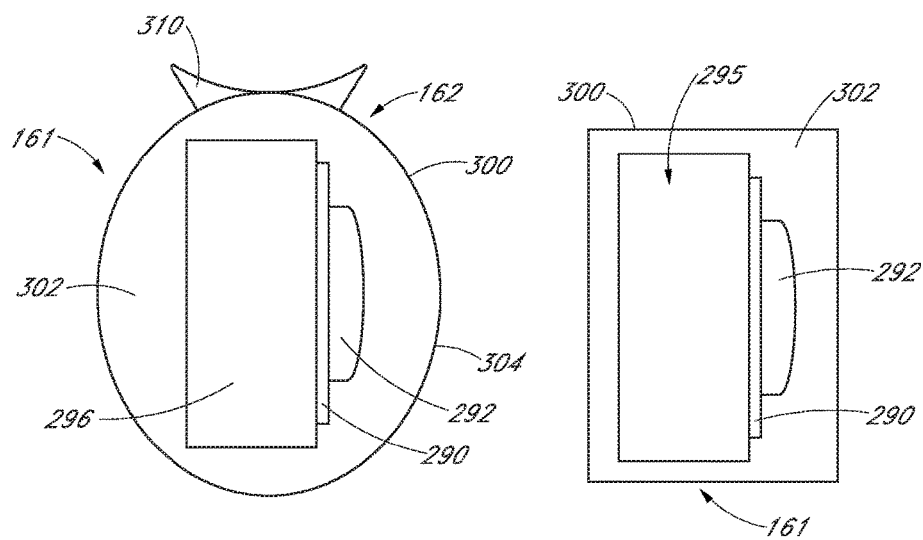
FIGS. 7F-7I show four different versions of a lighting element assembly.

FIG. 7G is an alternative lighting element assembly 161 comprising a light assembly 295 comprising a rigid housing 296 and a lighting element 160 mounted inside a transparent housing 300. In the present embodiment, the wall surfaces of the housing 300 are generally planar. Thus, when a clear casting epoxy resin is added to the empty space 302 of the housing and cured, a generally constant epoxy layer is formed over each LED 292. The cured epoxy helps to hold the lighting assembly 160 within the housing 300 but does not otherwise diffract or collimate light any significant amount.

Figures 7H, 7I:
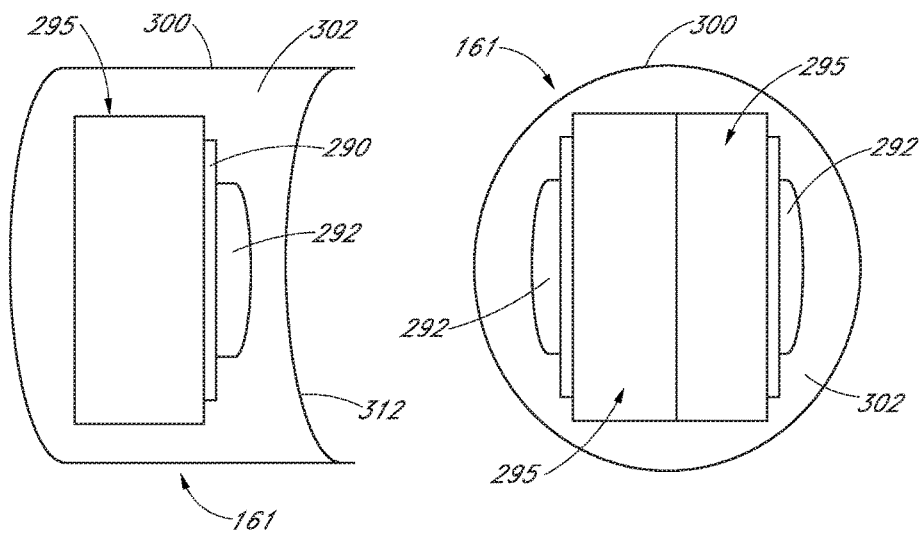

FIG. 7H is an alternative lighting element assembly 161 comprising a light assembly 295 comprising a rigid housing 296 and a lighting element 160 mounted inside a transparent housing 300. In the present embodiment, the wall surfaces of the housing 300 have a generally concave surface 312. Thus, when a clear casting epoxy resin is added to the empty space 302 of the housing and cured, a generally convex layer, relative to each LED 292, is formed over each LED 292. The cured epoxy helps to hold the lighting assembly 160 within the housing 300 and the convex layer acts to generally focus the emitted light.

In some examples, two rows of light assemblies 295 may be placed into the housing 300 of FIGS. 7G and 7H to form a lighting element assembly 161 comprising two rows of lighting elements 160, similar to that of FIG. 7I but with different housing surfaces. One or more brackets 310 may also be included to secure the lighting element assemblies 161 to the steps of the present disclosure.

In various embodiments of the invention, lighting elements 160 can be installed and/or attached in various positions. In some embodiments, specific lighting element position grooves, slots, holes, and other installation locations are created during manufacturing specifically for lighting element positioning. In other embodiments, lighting elements 160 may be added, attached, and/or affixed in locations which were not created specifically for lighting elements.

Figure 6:
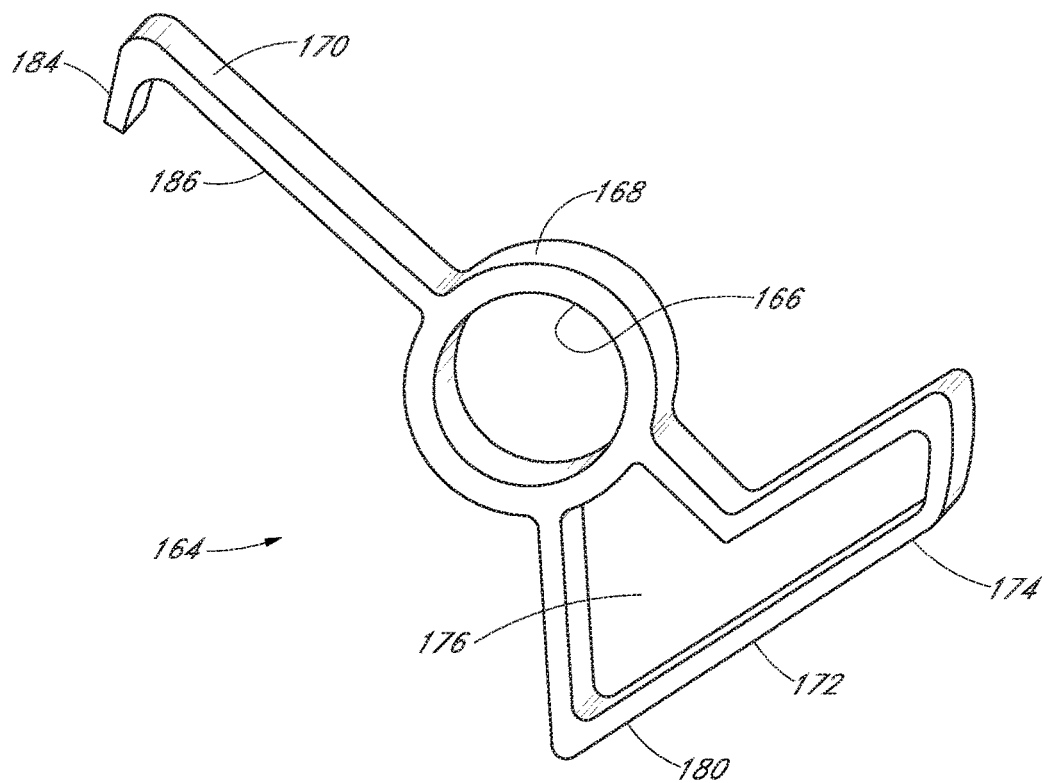
FIG. 6 is an example embodiment of a mount usable to mount a lighting element.

Turning to FIG. 6, an example embodiment of a lighting support structure or lighting mounting bracket 164 of FIG. 5 is shown. In the example embodiment, the lighting support structure 164 includes a fitted hole 166 to snugly fit an end of the lighting element 160 therein. The fitted hole 166 may be formed with a continuous ring or a ring with a gap 168 defining the fitted hole 166. In other examples, the shape of the ring 168 can be other than round and is sized and shaped to fit the size and shape of the lighting element 160. A first support 170 and second support 172 extend from the ring 168 to engage the underside dimensions of the step bar 112 (FIG. 5) such that the first and second supports 170, 172 will not break free during normal vehicle operation. The lighting support structure 164 can be made from a thermoplastic, a thermoplastic elastomer (TPE), a rubber material, or combinations thereof. In some embodiments, the lighting support structure 164 is made from a metal material. In some embodiments, adhesives can be used to hold the lighting support structure 164 in place. As shown, the second support 172 has a loop 176 defined by a perimeter 174. A contact section 180 is provided at a side or edge of the perimeter 174 and configured to abut a corresponding surface in the underside cavity 182 (FIG. 5) of the step bar 112. Another contact section 184 is provided at the first support 170, which extends from an elongated extension 186. The two contact sections 180, 184 of the first and second supports 170, 172 press against interior surfaces of the underside cavity 182 of the step bar 112 to form a bias or snap fit arrangement with the underside cavity of the step bar. The lighting support structures 164 can be attached to the step bar 112 by sliding them through the underside opening 159 opposite the landing surface 152.

The snap fit arrangement between the lighting support structure 164 and the step bar 112 are more clearly shown in the partial perspective view of FIG. 7, which shows the base bar 112 without the attachment flanges 114. As shown, the step bar 112 has a body 190 comprising a landing surface 152, a back angle front edge 154, and a back angle rear edge 158. The back angle front edge 154 can be longer than the back angle rear edge 158 and both taper inwardly towards one another. A first internal contact surface 196 and a second internal contact surface 198 are provided in the underside cavity 182 of the step bar 112. In some embodiments, the lighting support structure 164 is configured to snap into place in the underside cavity 182 by wedging the contact section 184 of the first support 170 against one of the interior contact surfaces 196 of the step bar and the contact section 180 of the second support 172 against the other interior contact surface 198 of the underside cavity 182. Thus, as disclosed, one or more lighting elements 160 can be retained under the step plate 112 of the present disclosure using one or more clips or brackets, adhesives, or other retaining structures. The lighting element can be selected to emit light in one direction or multiple directions, including out the holes and out the underside opening of the step bar.

FIG. 7A is an alternative step 104 provided in accordance with aspects of the present disclosure. As shown, the step 104 is attached to an extruded support member 102, which is shown in phantom and can embody any number of support members 102, such as that shown in FIGS. 1 and 4. For example, the step 104 disclosed herein with reference to FIG. 7A may be usable with a non-circular or non-round shaped extruded support member 102. The present step 104 can comprise two attachment brackets or flanges 114, one each at each end of the step bar 112, which can embody the step bar of FIG. 7. However, in the present embodiment, the two attachment brackets 114 are not separately attached to the step bar 112 but are attached to a lower step bar 112a (FIG. 7B) forming a step bar sub-assembly 270. For example, the two attachment brackets 114 can be part of a round tubing and the step bar sub-assembly 270 is formed by bending the tubing to form at least two bends 272 to form a step bar sub-assembly 270 comprising two attachment brackets 114 and a lower step bar 112a. The two tubular attachment brackets 114 and the lower step bar 112a can be unitarily formed or separately formed and subsequently attached together, such as by welding. When formed by bending, the bends 272 can have an angle measured between each respective attachment bracket and the lower step bar of about 100 degrees to about 150 degrees. In other examples, the angles can be different, such as smaller than 100 degrees or larger than 150 degrees. Each attachment bracket 114 may include one or more bends to form a desired fit or shape, such as to form a certain contour or a certain look to fit the extruded support member 102. A working edge 276 may be provided at the terminal end 274 of the two attachment brackets 114 to fit against the support member 102 and attached thereto. For example, each terminal end 274 can be machined and/or grounded with a fitted surface for mating against a corresponding surface on the extruded support member 102 to be attached thereto, such as by welding, fasteners, and/or rivets.

With reference to FIG. 7B and continued reference to FIG. 7A, a cross-sectional side view of the alternative step taken along line 7B-7B of FIG. 7A is shown. A step bar 112, such as the step bar of FIG. 7, is shown attached to the lower step bar 112a of the sub-assembly 270. Like the step bar 112 of FIG. 7, the present step bar includes holes or openings on the landing surface 152 so that a lighting element can emit light through the plurality of holes or openings. For example, the underside surface 278 of the body 190 can rest on the lower step bar 112a and the back angle front edge 154 of the step bar 112 can straddle the side of the lower step bar 112a on the side closer to the vehicle. Continuous welds or tack welds may be used to weld the step bar 112 to the lower step bar 112a. The back angle rear edge 158 of the step bar 112 can extend away from the lower step bar 112a and the interior contact surface 196 can act or function as a mounting surface for a light assembly, as further discussed below. In an alternative embodiment, the back angle rear edge 158 is in contact with the lower step bar 112a and is welded thereto while the back angle front edge 154 is spaced from the lower step bar. When so configured, the interior contact surface 198 of the back angle front edge 154 can function as a mounting surface for a light assembly or light element.

Figure 8:
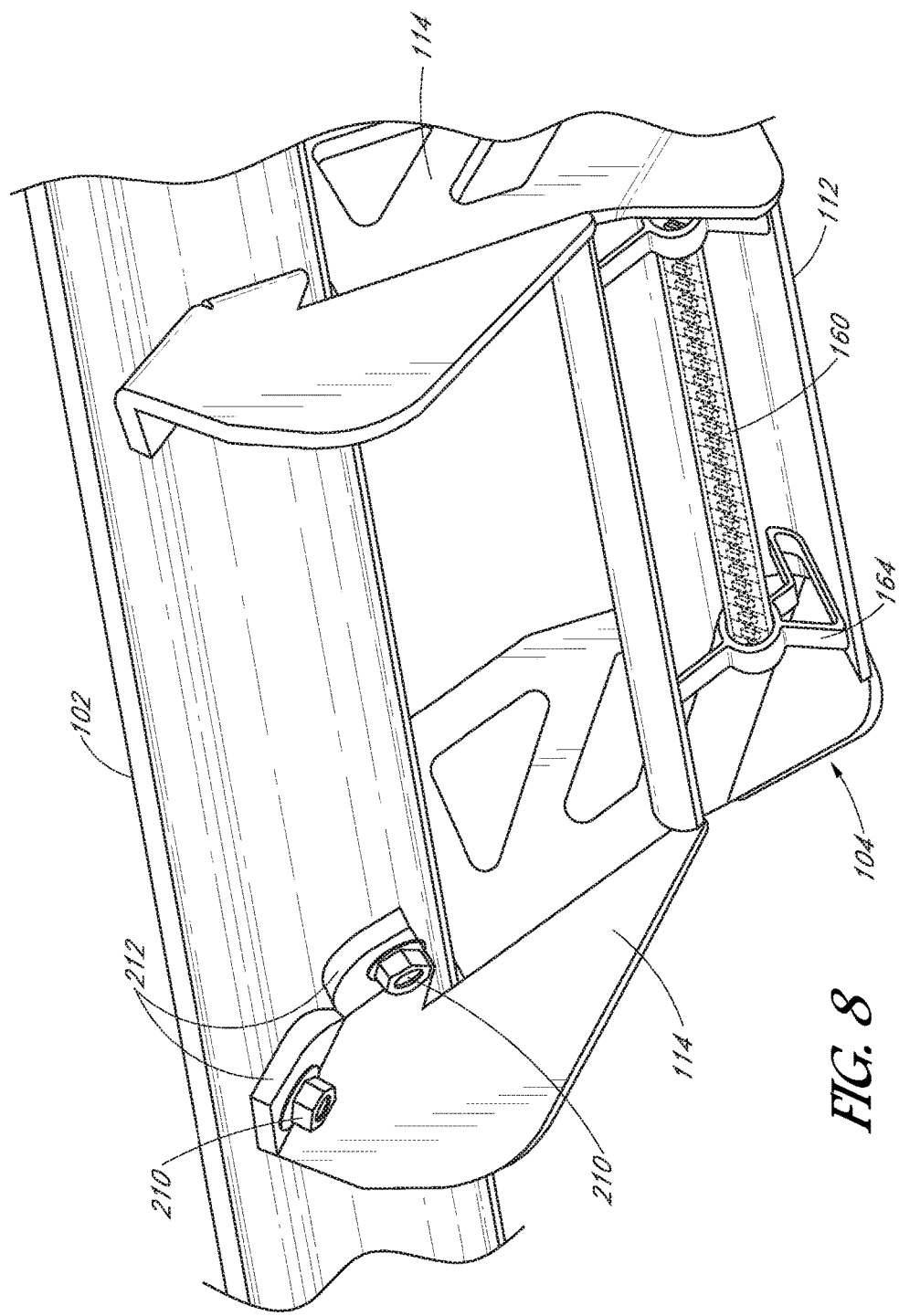
FIG. 8 is an example embodiment of a step mounted to an extruded support member.

Turning to FIG. 8, an exemplary embodiment of a step 104 mounted to an extruded support member 102 is shown. In the example embodiment, the step 104 is mounted to the extruded support member 102 using fasteners 210, such as four bolts—two for each attachment flange 114. As shown, screws 210 are inserted into channels 212 formed with the attachment flanges 114 along the lower surface of the extruded support member 102 such that the threaded end of the screw 110 faces outward from the extruded support member 102 and the head of the screw is held in the channel 212.

Figure 8A:
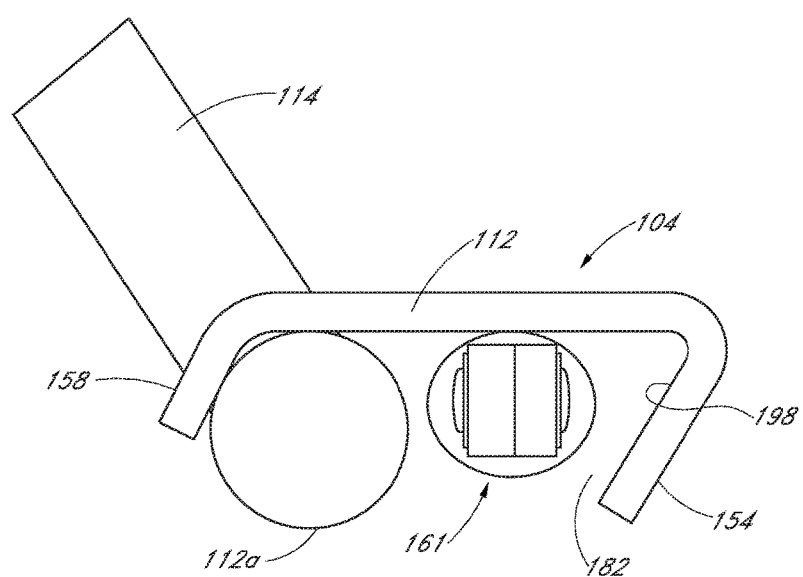
FIG. 8A is a schematic cross-sectional side view of an alternative step having a lighting element connected thereto.

With reference to FIG. 8A, the step assembly 104 of FIGS. 7A and 7B is shown with a light element assembly 161 mounted inside the underside cavity 182 of the step bar 112. As shown, the lighting element assembly 161 is attached to the lower step bar 112a. Alternatively, the lighting element assembly 161 may be attached to either the back angle front edge 154 or the back angle rear edge 158 of the step bar 112. Gaps, spacers, brackets, flanges, clips, and fasteners may be employed to ensure appropriate mounting for the required application, such as to illuminate up, illuminate down, or to illuminate up and down, as previously discussed. The lighting element assembly 161 shown with FIG. 8A may be any of the various light element assemblies discussed elsewhere herein.

Figure 9:
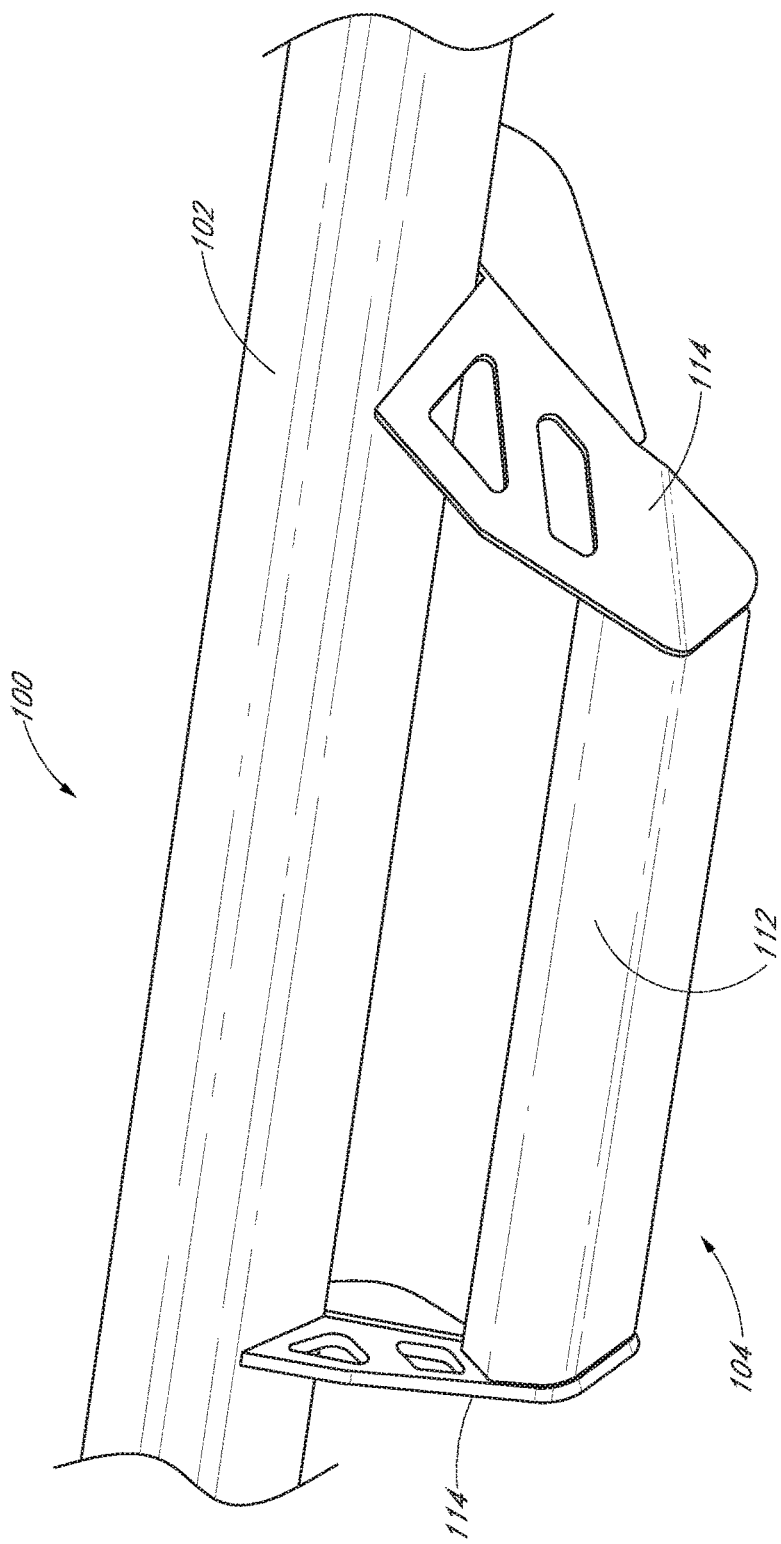
FIG. 9 is an example embodiment of a step mounted to an extruded support member.

FIG. 9 is a blown up view of the support device 100, which more closely shows the extruded support member 102 and a step 104 having two attachment flanges attached to the support member. Although not shown, holes may be provided through the surfaces of the step bar 112 and/or the support member 102.

Figure 10:
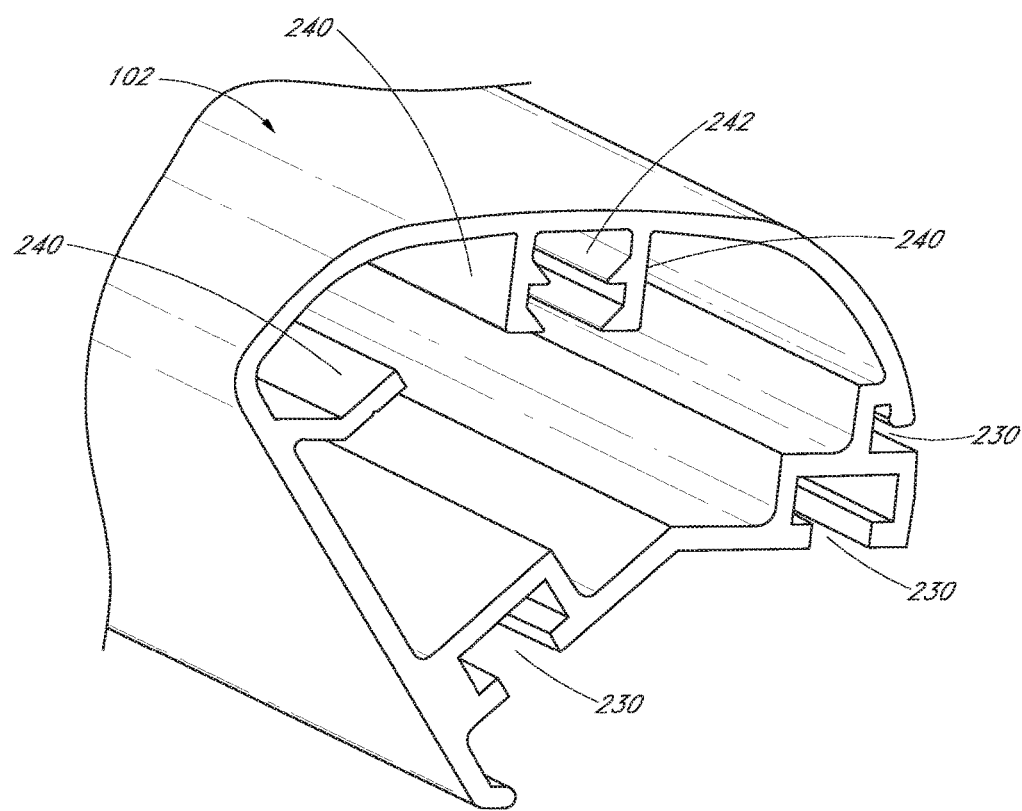
FIG. 10 is an example embodiment of an extruded support member.

FIG. 10 shows an end perspective view of an alternative extruded support member 102 provided in accordance with aspects of the present disclosure. As shown, the alternative support member 102 incorporates one or more channels 230 that allow any number of bolts and/or screws to be inserted and adjusted to one of any number of positions. For example, the channels 212 (FIG. 8) on the attachment flange 114 and the channels 230 on the support member 102 can receive bolts or screws to enable the step 104 to be mounted along any desired axial position along the length of the alternative support member 102. This design enables fitting of the steps to various vehicle designs by enabling the steps to be axially re-positioned on the support member 102 to fit or match the vehicle cabin and doors. The channels also allow for installation of gap guards and/or lighting elements to be mounted to the alternative extruded support member 102. One or more interior ribs 240 are incorporated for increased structural integrity. Two adjacent interior ribs 240 can define an interior channel 242 for engaging an end cap 120, such as brackets that interface between the end cap and the interior channel.

Figure 11:
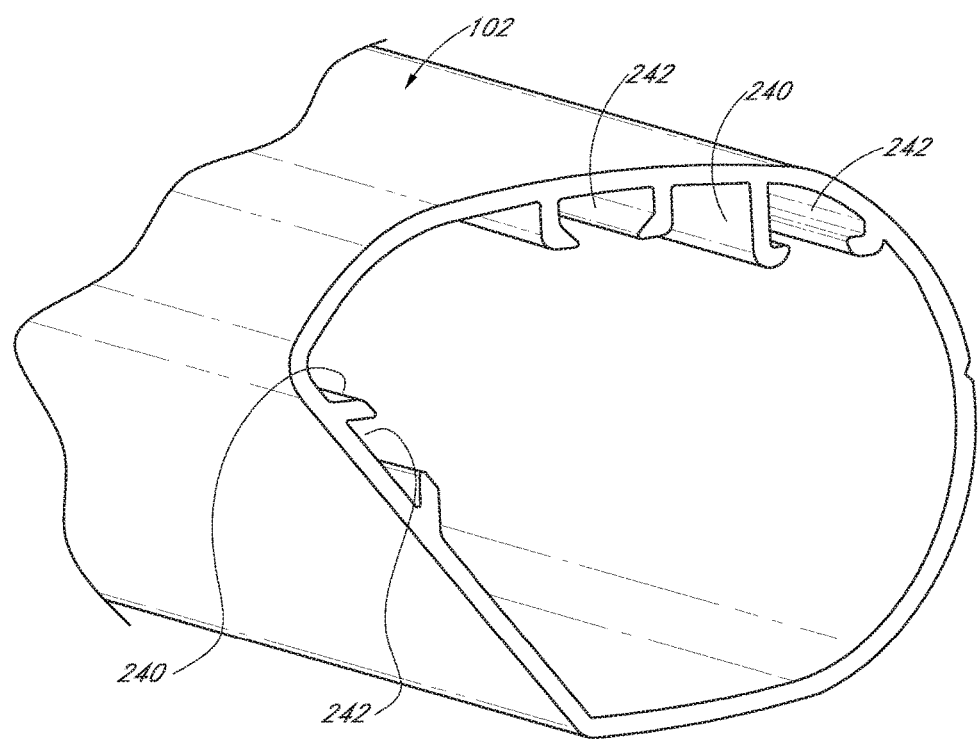
FIG. 11 is an example embodiment of an extruded support member.

With reference now to FIG. 11, another alternative support member 102 provided in accordance with aspects of the present invention is disclosed. The present support member is similar to the support member shown in FIG. 10 with a few exceptions. In the present alternative support member 102, brackets can be pre-welded to the extruded support member 102 to enable quicker installation and reduce weight. Interior channels 242 created by interior ribs 240 on the inner surfaces of the extruded support element 102 can be used to provide locations for end-cap 120 (FIG. 4) specific installation brackets.

In some embodiments, the extruded support members 102 discussed elsewhere herein may be mounted in other locations than in proximity to the passenger compartment. For example, the extruded support members disclosed herein may be mounted along the front of a vehicle to provide individuals with access to the front of a vehicle. This aspect may be useful for working on an engine which in many embodiments is located under the vehicle hood in the front of the vehicle. In some embodiments, the extruded support members disclosed herein may be mounted along the side of a truck bed. This may provide users with the ability to access the contents of the truck bed from the side without having to step up on an uneven tire surface or from a tailgate location. Similarly, on a sport utility vehicle, a side mounting may provide access to a roof-rack for carrying equipment. In some embodiments, the extruded support members disclosed herein may be located at the rear of a vehicle to provide access to truck beds, trunks or other storage compartments, which may not be easily accessed without use of the extruded support members.

In some embodiments, additional structures, pieces or components may be present and may provide additional support, convenience and/or safety features. Examples may include chains, hinges, springs, cables, ropes, wires, locks, magnets, vacuums, nuts, bolts, buttons, buckles, ties, clamps, pins, flanges, grommets, pegs, rings, rivets, anchors, staples, stitches, straps, ties, zippers, ratchets, latches, levers, pulleys and others.

With reference again to FIGS. 8 and 10, in some embodiments, the lighting elements 160, light assemblies 295, and lighting element assemblies 161 discussed elsewhere herein may be mounted directly to the extruded support member 102, in addition to or as an alternative to mounting the lighting fixtures to the steps 104. For example, when steps 104 are omitted from a support device 100, the lighting fixtures, such as the lighting elements 160, light assemblies 295, and/or lighting element assemblies 161 as described elsewhere herein, can be mounted directly to the extruded support member 102. Brackets, clips, and/or fasteners may attach to the channels 230 (FIG. 10) on the extruded support member 102 and then attached or connected to the lighting fixtures. This allows the lighting fixture to emit light upwardly from the extruded support member 102 towards the roof of the vehicle and/or in the opposite direction towards the ground surfaces. The lighting fixture may be powered and controlled in accordance with previously discussed options.

In some examples where a support device 100 has both an extruded support member 102 and one or more steps 104, the lighting fixture may be installed on just the extruded support member 102 for illuminating the one or more steps 104 when activated. Optionally, the one or more steps 104 may also be equipped with lighting fixtures, in addition to the support member 102, as discussed herein above.

In still other examples, a vehicle's running board, which may come standard with the vehicle or added as an aftermarket add-on and can resemble an extruded support member 102 discussed elsewhere herein, may be used for mounting a lighting fixture of the present disclosure, such as the lighting elements 160, light assemblies 295, and lighting element assemblies 161 discussed herein. A running board is typically an elongated body, typically hollow, mounted at or near the bottom of a vehicle along a side edge of the vehicle between the front wheel well and the rear wheel well. There are typically two running boards on a vehicle, one on each side of the vehicle. A running board may serve as a support device to help a passenger access a vehicle. For example, a passenger can step onto the elongated body before stepping into the vehicle. In an example, a lighting element 160 or a lighting element assembly 161 comprising cured epoxy resin, may be mounted to a vehicle's running board and energized and controlled in accordance with previously discussed options.

Methods of making and of using the support devices and their components are understood to be within the scope of the present disclosure.

Although limited embodiments of support devices and assemblies and their components have been specifically described and illustrated herein, many modifications and variations will be apparent to those skilled in the art. For example, the various support devices may incorporate custom paint, have different outer contoured shapes, provided with metallic overcoats, etc. Furthermore, it is understood and contemplated that features specifically discussed for one support device embodiment may be adopted for inclusion with another support device embodiment, provided the functions are compatible. Accordingly, it is to be understood that the support devices and assemblies and their components constructed according to principles of the disclosed device, system, and method may be embodied other than as specifically described herein. The disclosure is also defined in the following claims.

What is claimed is:

1. A support device for facilitating access into a vehicle comprising:
    an elongate support member comprising a body with a length and a hollow cavity; said body having a non-circular cross-sectional profile with an upper landing surface and a side surface extending therefrom;
    brackets coupled to the elongate support member for mounting the elongate support member to a vehicle;
    a first step bar sub-assembly comprising a first attachment flange and a second attachment flange, said first and second attachment flanges attached to the side surface of the elongate support member;
    a first step affixed to the first step sub-assembly, said first step comprising a body with two ends and a landing surface comprising a plurality of openings allowing light to pass therethrough, said two ends of the body located between the first attachment flange and the second attachment flange of the first step bar sub-assembly;
    a lighting element located below the landing surface of the first step configured for emitting light out through the plurality of openings of the first step when powered;
    a second step bar sub-assembly spaced from the first step bar sub-assembly, said second step bar sub-assembly comprising a first attachment flange and a second attachment flange, said first and second attachment flanges attached to the side surface of the elongate support member; and a second step affixed to the second step sub-assembly, said second step comprising a body with two ends and a landing surface comprising a plurality of openings allowing light to pass therethrough, said two ends of the body located between the first attachment flange and the second attachment flange of the second step bar sub-assembly.

2. The support device of claim 1, further comprising a mounting bracket for securing the lighting element to the first step.

3. The support device of claim 1, wherein the elongate support member is an extruded support member made from aluminum.

4. The support device of claim 1, wherein the first step bar sub-assembly comprises a round tubing having at least two bends forming the first and second attachment flanges.

5. The support device of claim 4, wherein the first and second attachment flanges of the first step bar sub-assembly are welded to the side surface of the elongate support member.

6. The support device of claim 1, wherein the lighting element located below the landing surface of the first step emits light up through the plurality of openings and down in a direction opposite the plurality of openings.

7. A support device for facilitating access into a vehicle comprising:

an elongate support member comprising a body with a length, a first end, a second end, and a hollow cavity; said body having an upper landing surface defining a plane and a side surface extending from the upper surface, wherein said body of the elongate support member having a non-circular cross-sectional profile;

brackets welded to or fastened to the elongate support member for mounting the elongate support member to a vehicle;

a first step attached to the elongate support member and repositionable along the length of the elongate support member, said first step comprising two attachment flanges, said two attachment flanges extending away from the side surface of the elongate support member and having a first step bar located between the two attachment flanges of the first step, said first step bar comprising a landing surface comprising a plurality of spaced apart openings allowing light to pass therethrough; and a second step attached to the elongate support member and repositionable along the length of the elongate support member, said second step being spaced from the first step, said second step comprising two attachment flanges, said two attachment flanges extending away from the side surface of the elongate support member and having a second step bar located between the two attachment flanges of the second step, said second step bar comprising a landing surface comprising a plurality of spaced apart openings allowing light to pass therethrough.

8. The support device of claim 7, further comprising a first end cap attached to the first end and a second end cap attached to the second end of the elongate support member.

9. The support device of claim 7, wherein the side surface of the elongate support member is angled from the upper surface to define a slanted side surface.

10. The support device of claim 9, wherein the two attachment flanges bar sub assembly of the first step are secured to a channel formed with the elongate support member using fasteners.

11. The support device of claim 10, wherein each of the two attachment flanges of the first step comprises a channel for receiving a respective fastener.

12. The support device of claim 11, wherein the landing surface of the first step bar comprises a generally planar surface.

13. The support device of claim 7, wherein each of the brackets welded to or fastened to the elongate support member comprises a plurality of spaced apart openings for use to secure the elongate support member to a vehicle.

14. The support device of claim 7, further comprising a lighting element mounted below the landing surface of first step bar of the first step and configured to emit light through the plurality of spaced apart openings of the first step bar.

15. The support device of claim 14, further comprising a mount coupled to the lighting element and to the step bar.

16. The support device of claim 7, wherein the elongate support member is an extruded support member made from aluminum.

17. A support device for facilitating access into a vehicle comprising:

an elongate support member comprising a body with a length and a hollow cavity; said body having a non-circular cross-sectional profile;

brackets attached to the elongate support member for mounting the elongate support member to a vehicle;

a first step affixed to a first step bar sub-assembly and the first step bar sub-assembly affixed to the elongate support member, wherein the first step comprises a first landing surface comprising a plurality of openings allowing light to pass therethrough, a first end and a second end;

the first step bar sub-assembly affixed directly to the elongate support member, said first step bar sub-assembly comprising two suspension arms and a step bar surface and the two suspension arms attached directly to the elongate support member, wherein said first landing surface and said step bar surface of said first step bar sub-assembly are located on two different elevations;

a second step affixed to a second step bar sub-assembly and the second step bar sub- assembly affixed to the elongate support member, wherein the second step comprises a second landing surface comprising a plurality of openings allowing light to pass therethrough, a first end, and a second end; and the second step bar sub-assembly affixed directly to the elongate support member, said second step bar sub-assembly comprising two suspension arms and a step bar surface and the two suspension arms attached directly to the elongate support member, wherein said second landing surface and said step bar surface of said second step bar sub-assembly are located on two different elevations.

18. The support device of claim 17, further comprising a lighting element attached to the first landing surface.

19. The support device of claim 17, wherein the two suspension arms of the first step bar sub-assembly are welded to a side surface depending from an upper landing surface of the elongate support member.

20. The support device of claim 19, wherein the side surface is angled from the upper landing surface to define a slanted side surface.

21. The support device of claim 20, wherein the first step bar sub-assembly comprises a round tubing having at least two bends.

22. The support device of claim 21, wherein the step bar surface of the first step bar sub-assembly is located between the at least two bends.

23. The support device of claim 19, wherein the two suspension arms of the second step bar sub-assembly are welded to the side surface of the elongate support member and spaced from the first step bar sub-assembly.

24. The support device of claim 17, further comprising a first end cap attached to a first end of the elongate support member and a second end cap attached to a second end of the elongate support member.

25. The support device of claim 17, wherein a first end and a second end of the elongate support member are both welded close.

26. The support device of claim 17, wherein the brackets each comprises a plurality of spaced apart openings for use to secure the support device to a vehicle.

27. The support device of claim 17, wherein the elongate support member is an extruded support member made from aluminum.

28. The support device of claim 17, wherein the two suspension arms of the first step bar sub-assembly each comprises a working edge and wherein the working edge is fitted against the side surface of the elongate support member.

29. The support device of claim 17, wherein the two suspension arms of the first step bar sub-assembly and the two suspension arms of the second step bar sub-assembly are removably fastened to one or more channels on the elongate support member.

30. The support device of claim 29, wherein the plurality of openings of the first step are exposed from a point above the support device and from a point below the support device, adjacent the ground when the support device is mounted to a vehicle.

31. The support device of claim 29, further comprising a lighting element located below the first landing surface of the first step configured for emitting light out through the plurality of openings of the first step when powered.

* * * * *

UNITED STATES PATENT AND TRADEMARK OFFICE
CERTIFICATE OF CORRECTION

PATENT NO. : 9,796,336 B2
APPLICATION NO. : 15/191168
DATED : October 24, 2017
INVENTOR(S) : Robert Crandall and William H. Cord Page 1 of 1

It is certified that error appears in the above-identified patent and that said Letters Patent is hereby corrected as shown below:

On the Title Page

In Column 2, item (56) in "Other Publications", Line 1, delete "Photgraph" and insert -- Photograph --, therefor.

In the Specification

In Column 12, Line 52, delete "elastometer" and insert -- elastomer --, therefor.

In the Claims

In Column 18, Line 2, in Claim 10, after "flanges" delete "bar sub assembly".

In Column 18, Line 46, in Claim 17, delete "sub- assembly" and insert -- sub-assembly --, therefor.

Signed and Sealed this
Twenty-sixth Day of March, 2019

Andrei Iancu
*Director of the United States Patent and Trademark Office*